United States Patent [19]

Liu

[11] 4,379,172
[45] Apr. 5, 1983

[54] SEPARATING VOLATILE AROMATICS FROM ROASTED AND GROUND COFFEE

[75] Inventor: Richard T. Liu, Worthington, Ohio

[73] Assignee: Societe D'Assistance Technique pour Produits Nestle S.A., Lausanne, Switzerland

[21] Appl. No.: 249,701

[22] Filed: Apr. 14, 1981

Related U.S. Application Data

[63] Continuation-in-part of Ser. No. 156,166, Jun. 3, 1980, abandoned.

[51] Int. Cl.³ .......................... A23F 5/48; A23F 5/50
[52] U.S. Cl. ................................. 426/386; 426/387; 426/432; 426/434
[58] Field of Search ............... 426/386, 387, 432, 434

[56] References Cited

U.S. PATENT DOCUMENTS

| | | | |
|---|---|---|---|
| 2,432,759 | 12/1947 | Heyman | 426/386 X |
| 3,148,070 | 9/1964 | Mishkin et al. | 426/386 |
| 3,244,532 | 4/1966 | Mahlmann | 426/386 |
| 4,072,761 | 2/1978 | Margolis et al. | 426/387 |

FOREIGN PATENT DOCUMENTS 1001476  12/1976  Canada .............................. 426/387

OTHER PUBLICATIONS

Sivetz, et al. Coffee Processing Technology, vol. I, 1963 Avi: Westport, Conn., pp. 297-300.

*Primary Examiner*—Joseph M. Golian
*Attorney, Agent, or Firm*—Vogt & O'Donnell

[57] ABSTRACT

A process for collecting volatile aromatics which are entrained with gases evolved during the wetting and extraction of fresh roasted and ground coffee beans and contained in part within the extract itself, and thereafter combining the collected volatile aromatics with processed coffee extract and/or soluble coffee to produce an instant coffee product having improved flavor and aroma is disclosed. The instant coffee product obtained by this process is also disclosed.

11 Claims, 4 Drawing Figures

SEPARATING VOLATILE AROMATICS FROM ROASTED AND GROUND COFFEE

CROSS-REFERENCE TO RELATED APPLICATIONS

This application is a continuation-in-part of abandoned application Ser. No. 156,166, filed June 3, 1980, the contents of which are incorporated herein by reference.

BACKGROUND OF THE INVENTION

1. Field of the Invention

This invention pertains to the field of instant coffee products. More particularly, the present invention is concerned with a process for collecting volatile aromatics liberated from roasted and ground coffee using gases which are present in the ground roast coffee and which act as a stripping medium and/or carrier for the volatile aromatics, and employing the collected volatile aromatics to make an instant coffee product having improved organoleptic properties.

2. Description of the Prior Art

The desirability of preparing an instant coffee product containing much of the aromatic materials originally contained within fresh roasted coffee beans, to provide an instant coffee having aroma and flavor comparable to fresh roasted coffee, has long been recognized.

According to one published source (Clifford, M. N., "The Composition of Green and Roasted Coffee Beans", *Process Biochemistry*, pp. 13–19, May 1975), taking fresh roasted coffee beans as containing 100% volatiles, during grinding of the roasted beans preliminary to the preparation of instant coffee a loss of about 14% of the volatiles is experienced. Further according to that source, during subsequent processing, i.e., extraction, concentration and drying, where no measures are taken to prevent the loss of volatiles, an additional 72% of the volatiles are lost. Thus, the final instant coffee retains a mere 14% of the original roast coffee volatiles.

Various expedients have been suggested in the prior art in an attempt to prevent the loss of volatile aromatics. Thus, techniques have been developed which, for example, are directed to recovering the volatiles evolved during the grinding of the roasted coffee beans. Other techniques have been proposed for preventing the loss of volatiles during subsequent processing steps. For example, aromatic constituents contained within the coffee extract may be removed and collected prior to concentration of the extract, e.g., stripping of the extract, and the removed volatiles may then be returned to the extract after it has been concentrated.

Various proposals have also been made to recover volatile aromatics which are normally lost during the extraction step, with which this invention is principally concerned. One such proposal, as disclosed in U.S. Pat. No. 2,432,759 issued to Heyman, for example, involves steam stripping volatile aromatics from a fresh extraction cell of roasted and ground coffee which has not been contacted with the extraction medium. After passing the steam through the extraction cell, the volatiles-laden steam is then passed through a number of condensers. Condensed volatile aromatics may then be added back to the concentrated extract.

That and similar techniques may suffer from a number of disadvantages. The extra time and expense required may be economically undesirable. Additionally, steam stripping unextracted ground roast coffee may subject the ground coffee to high temperatures which may cause some undesirable thermal degradation of its components.

In another technique involving recovery of volatile aromatics during the extraction step, steam is internally generated within the coffee extract as it leaves the final percolator. Such a technique is described, for example, in Canadian Pat. No. 1,001,476 issued to Bolt. In the Bolt technique, liquid coffee extract is first produced by a battery of percolators. The conditions in the Bolt process are such that steam is internally generated within the coffee extract as it leaves the final percolator. The extract at this point is at a temperature in the range of from about 100° C. to 127° C. The liquid extract is then passed through a separation chamber where flash evaporation of water and volatile aromatics takes place and where the aromatics-laden gases are separated from the liquid coffee extract. The volatile aromatics are then condensed and may be returned to the coffee extract either before or after that extract has been concentrated.

Although steam is internally generated within the coffee extract in the Bolt technique, in contrast to the technique described above wherein an external source of steam is provided for stripping, the Bolt process may nevertheless still suffer from a number of the same disadvantages discussed above. Thus, as in conventional steam stripping techniques, the employment of high temperatures for the internal generation of steam within the coffee extract may also cause some undesirable thermal degradation of its components.

Yet another technique involving the recovery of volatile aromatics during the extraction or percolation step (these terms conventionally being used interchangeably in the art) involves collecting volatile aromatics entrained with the gases that are evolved during the wetting of fresh roasted and ground coffee with an extraction medium.

In particular, as a result of roasting green coffee beans, carbon dioxide is produced; a substantial amount of which is occluded within the cells of the coffee even after the coffee beans have been ground. Additionally, air also fills the interstitial voids between the ground particles of coffee.

The first step in extraction is to wet the dry, fresh roasted and ground coffee with a hot extraction medium. As the extraction medium enters the bottom of a percolator in which the ground coffee is contained and begins to rise and fill the percolator, it gradually wets the roasted and ground coffee. While doing so, the extraction medium simultaneously displaces, with a "piston-like" effect, carbon dioxide, air and volatile aromatics which become entrained with these gases. For the sake of convenience and clarity, the term aromatics-laden gases will be used throughout this application to designate the mixture of carbon dioxide, air and any volatile aromatics that may be entrained with these gases.

During the wetting step, it is generally common to simply vent the aromatics-laden gases to the atmosphere as they are being evolved to prevent the possibility of the occurrence of undesirable foaming in the coffee extract.

At pages 297–300 of Volume 1 of "Coffee Processing Technology" by Sivetz, et al. (AVI, 1963), however, it is taught that there is a substantial amount of volatile aromatics entrained with the gases evolved during the wetting step of the percolator and that it is possible to recover these volatile aromatics by condensation.

Sivetz, et al. discloses taking the aromatics-laden gases evolved by the wetting step and passing them through a liquid-gas cyclone separator in which any extract that may have been carried over with the aromatics-laden gases from the extraction system is separated. The separated extract is then combined with unprocessed extract produced during subsequent extraction of the ground roast coffee. The separated aromatics-laden gases are then passed through an ice water chiller maintained at a temperature of 0° C. with iced cooling water wherein most of the water, acetic acid and the least volatile aromatic components are condensed and then separated from the remaining aromatics-laden gases by subsequent passage through another liquid-gas cyclone separator. Sivetz, et al. teaches that this first condensate is also to be combined with unprocessed coffee extract. Finally, the balance of the aromatics-laden gases is then passed through a cold trap which is cooled by Freon-11 and dry ice to −73.33° C. such that the aromatics-laden gases are cooled to −45.56° C. This second condensate, according to Sivetz, et al. is also combined with unprocessed coffee extract.

The Sivetz technique too suffers from a number of disadvantages. Sivetz only treats the aromatics-laden gases that are evolved during the wetting phase of the extraction step and therefore only obtains volatile aromatics that are entrained with this portion of aromatics-laden gases. As will be discussed more fully hereinafter, applicant has discovered that additional aromatics-laden gases are present within the coffee extract itself which contains even more desirable fractions of volatile aromatics than those contained with the aromatics-laden gases evolved during the wetting phase of the extraction step. Sivetz has no appreciation or recognition of this. By treating only the aromatics-laden gases evolved during the wetting phase, Sivetz fails to collect the additional and more desirable volatile aromatics which are still contained within the coffee extract.

Moreover, by combining the first condensate with the unprocessed extract, Sivetz is uneconomically adding water back to the extract which subsequently will only have to be removed. Additionally, by combining the entire first condensate with the extract, Sivetz may also be adding the least volatile components to the extract among which are those which may have undesirable, harsh notes. Also contained within this first condensate are aromatic fractions which are relatively highly volatile. By Sivetz's prescribed teachings, these fractions too are combined with unprocessed coffee extract where they will most probably be lost during subsequent processing.

Finally, Sivetz's requirement that the second condensate be obtained by employing a cold trap maintained at a temperature of −73.33° C. may also be undesirable. The refrigeration equipment involved is generally uneconomical and difficult to run due to ice formation. This second condensate may also contain undesirable aromatic fractions, particularly a −34.44° C. fraction which has a distinct but objectionable sulfury note. Nevertheless, however, Sivetz teaches that the entire second condensate, which may also contain the undesirable −34.44° C. fraction as well, is to be combined with the unprocessed extract.

SUMMARY OF THE INVENTION

Applicant has discovered a process for recovering volatile aromatics during the extraction of roasted and ground coffee and employs these recovered volatile aromatics to obtain an instant coffee product having improved in-cup flavor and in-jar aroma which avoids substantially all of the disadvantages associated with the prior art processes discussed above.

The process of the present invention economically and desirably utilizes the gases which are present in fresh roasted and ground coffee to act as a stripping medium and carrier for volatile aromatics contained within the ground coffee.

In particular, applicant treats and separates volatile aromatics entrained with the aromatics-laden gases evolved during the wetting phase of the extraction step and additionally treats the entire coffee extract to separate even more desirable volatile aromatics contained therein. Applicant has discovered that in addition to treating the aromatics-laden gases evolved by the wetting step, it is also highly desirable to treat the entire extract so as to remove additional aromatics-laden gases contained within the extract and recover very desirable volatile aromatics from these additionally removed aromatics-laden gases which are desirable in providing a more balanced and pleasing instant coffee product.

Accordingly, the present invention is directed to a process for making an instant coffee product which has improved flavor and aroma by treating all of the aromatics-laden gases that are evolved during the wetting and extraction steps so as to recover substantially all of the volatile aromatics present in the roasted and ground coffee. The process comprises wetting and extracting roasted and ground coffee beans with an extraction medium such that the temperature of the resulting extract is below 100° C., passing aromatics-laden gases evolved by the wetting step and the extract through a separation chamber wherein the aromatics-laden gases evolved by the wetting step and aromatics-laden gases entrained within the extract are separated from the extract, passing the separated aromatics-laden gases through at least two condensers wherein the first condenser condenses and removes water from the aromatics-laden gases and the last condenser is maintained at a temperature of from about 0° C. to 5° C. to condense volatile aromatics entrained with the aromatics-laden gases and then collecting the condensed volatile aromatics. The separated extract may then be processed to provide a dried instant coffee powder and the condensed volatile aromatics may be added to the extract after the extract has been concentrated or dried.

The present invention makes it possible to collect volatile aromatics from roasted and ground coffee without steam stripping. By eliminating steam stripping of the dry roasted ground coffee, the extraction step is considerably shortened and simplified since there is no longer any disruption of the normal extraction cell operation.

Despite the fact that the present invention does not resort to steam stripping where it might be expected that more volatile aromatics are obtained than with the technique of the present invention, quite unexpectedly, applicant has found that the total quantity of volatile aromatics obtained by the process of the present invention is substantially equal to that obtained by steam stripping. Thus, the present invention produces an instant coffee product having an intense and natural coffee-like in-jar aroma and a smooth, balanced in-cup coffee flavor on reconstitution with water.

The process of the present invention also avoids substantially all of the disadvantages associated with the Sivetz technique discussed above. Whereas Sivetz treats only the aromatics-laden gases evolved during the wetting step, the present invention treats these aromatics-laden gases as well as the entire coffee extract to obtain additional and even more desirable volatile aromatics. Additionally, whereas Sivetz combines the entire first condensate with unprocessed coffee extract, the present invention provides for at least one additional condenser which precedes the ice water chiller of Sivetz such that water and undesirable harsh, high boiling fractions are condensed and removed rather than being combined with the unprocessed extract as required by Sivetz. Finally, whereas Sivetz requires the aromatics-laden gases to be passed through a cold trap maintained at $-73.33°$ C., the present invention vents the aromatics-laden gases not condensed by the last condenser which is maintained at a temperature of about 0° C. to 5° C. so as to prevent undesirable fractions contained therein from being condensed and combined with the unprocessed coffee extract.

In a preferred embodiment of the process of the present invention, fresh, roasted and ground coffee is wetted by an extraction medium while at the same time, unextracted coffee that has been previously wetted is simultaneously extracted. The aromatics-laden gases that are evolved during the wetting step of the fresh, ground roasted coffee and the extract resulting from the extraction of the pre-wetted coffee are concurrently passed through a separation chamber and then processed as described above. The entire process of the present invention is made more efficient and economical in this manner by simultaneously providing substantially uniform and constant rates of flow of both the aromatics-laden gases and the extract from the separation chamber to the subsequent processing steps. Among other things, this further enables the aromatics-laden gases to act as an even better stripping and carrier medium for the desirable volatile aromatics. Other advantages of this embodiment will be discussed more fully hereinbelow.

The present invention accordingly provides for a simple and efficient process for recovering volatile aromatics during extraction and for employing these volatile aromatics to make a coffee product having improved flavor and aroma. The process presents no adverse effects, is economical and produces a highly desirable instant coffee product.

DETAILED DESCRIPTION OF THE INVENTION

Figure 1:
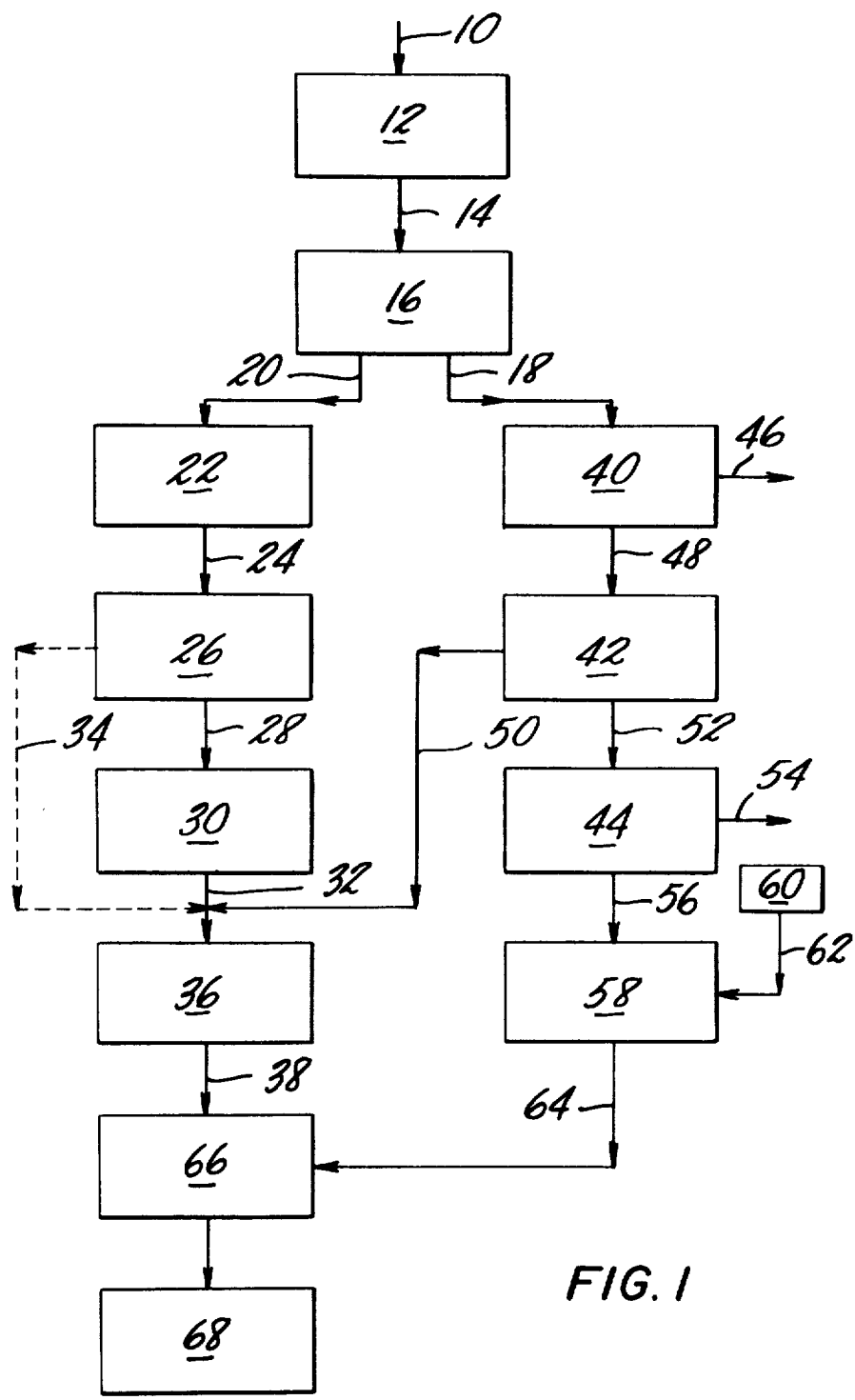
FIG. 1 is a schematic diagram of the process of the present invention.

Referring now to the drawings, and particularly to FIG. 1, the process of the present invention is carried out as follows:

An extraction medium is provided to first enter line 10 into a percolator 12 containing fresh roasted and ground coffee. The extraction medium employed may simply be hot water or water containing coffee solubles. Preferably, the extraction medium is coffee extract prepared from a conventional battery of percolator cells (not shown) which are serially connected and through which hot water is passed countercurrently to provide the coffee extract. The preparation of such a coffee extract is well known to one skilled in the art.

The extraction medium is pumped by a pump (not shown) into the bottom of percolator 12. The pressure created by the pump is just enough to force the extraction medium through percolator 12 and into a separation chamber 16 to be discussed more fully hereinbelow. Generally, the pressure existing in the extraction system is no more than about 0.34 bar above atmospheric.

As the extraction medium wets the dry roasted and ground coffee, gases laden with volatile aromatics are evolved and displayed upwardly as the extraction medium rises in and fills percolator 12. These aromatics-laden gases along with any coffee extract that may be carried over by the aromatics-laden gases and any extract that may have been held up in the lines from previous extractions are passed through line 14 into a separation chamber 16.

Separation chamber 16 is generally a liquid-gas cyclone separator. The particular separator employed in the present invention is not critical as long as it can effectively separate the aromatics-laden gases from the liquid extract. Any commercially available separator may be employed provided it meets this criterion.

In separation chamber 16, aromatics-laden gases are separated from liquid extract and pass into line 18. Correspondingly, separated extract passes into line 20.

As the wetting phase of the extraction step nears completion, the extraction of coffee solubles from the ground roast coffee begins as coffee extract (sometimes referred to as draw-off extract) begins to leave percolator 12 and enters line 14.

The ratio of the total weight of draw-off extract leaving percolator 12 to the weight of coffee contained in the percolator prior to extraction is conventionally referred to as the draw-off ratio. Generally, the larger the draw-off ratio, the more aromatics will be extracted from the roast, ground coffee contained in percolator 12. However, due to the practical physical and economical limitations of the subsequent processing steps in which substantially all of the water is ultimately removed, and because flavor damage during such concentration and drying steps is ordinarily proportional to the weight of water removed, a draw-off ratio of from about 2.0 to 4.0:1 is usually employed.

The temperature of the incoming extraction medium is controlled such that the draw-off extract is at a temperature which is below its boiling point. The temperature of the initial draw-off extract is generally about 60° C. to 70° C. and gradually rises as extraction continues to a peak temperature. Since the extraction medium is generally comprised of water and the pressure, as discussed above, is essentially atmospheric, the maximum temperature of the draw-off extract is such that it is less than 100° C. Preferably, the temperature is in the range of from about 80° C. to 98° C. By keeping the temperature of the extract below its boiling point, possible thermal degradation of the heat sensitive components contained within the ground coffee and the extract itself is avoided.

Without any interruption in the flow of material through line 14, the draw-off extract is allowed to continuously flow into separation chamber 16 until the entire extract has passed through the chamber so as to remove additional aromatics-laden gases entrained within the extract which in turn contains desirable volatile aromatics.

As an alternative embodiment, it is possible to employ supplementary means (not shown in drawings) to assist the stripping phenomenon that is taking place. It is noted, however, that supplementary means is in no way required in the process of the present invention. Thus, if desired, an inert gas, such as carbon dioxide, nitrogen and the like, may be supplied from an external source to lines 10 or 14. Alternatively, if desired, a heating means may be employed with line 14 so as to heat the initial draw-off extract which, as discussed above, is generally at a lower temperature than the extract withdrawn during the latter part of the extraction cycle such that essentially all of the extract entering the separation chamber is at a constant temperature throughout the entire extraction cycle.

The separated extract in line 20 may then be processed into a dry powder in a manner which is conventional in the art. During the processing of the separated extract, however, volatile aromatics obtained from the aromatics-laden gases, which will be discussed more fully hereinbelow, may be added to the extract during various steps of its processing.

In particular, the separated extract in line 20 is usually pumped (not shown) through a cooler 22 to prevent the loss of any volatiles that may still be contained within the extract and to generally minimize the amount of exposure that the extract experiences to the relatively high extraction temperatures. Generally, the separated extract is cooled to a temperature of about 50° C. to 65° C. Cooler 22 may be any conventional type of heat exchanger.

After being cooled, the extract may then be concentrated in any conventional manner prior to being dried. To avoid the loss of aromatic constituents contained within the extract during the concentration step, it is generally desirable to first remove these aromatic constituents from the extract. Accordingly, after the cooled extract leaves cooler 22 in line 24, it is desirably treated to remove aromatics. The aromatic removal step is schematically shown in FIG. 1 as aromatic removal means 26. The aromatic constituents may be removed by any means conventional in the art. Typically, they are removed by steam stripping of the extract.

The extract, now stripped of its aromatics may then be concentrated to any desirable degree. The concentration step is schematically shown in FIG. 1 as concentration means 30. As is well known to one skilled in the art, the extract may be concentrated by means of freeze concentration, vacuum evaporation and the like. The particular concentration method employed is not at all critical to the present invention. Thus, after the stripped extract leaves aromatic removal means 26 and proceeds through line 28, the aromatics which were removed in aromatic removal means 26 may be passed through line 34 and returned to the concentrated extract at line 32. The concentrated extract with added aromatics may then be dried by conventional means. In FIG. 1, this is schematically shown as drying means 36. As is well known in the art, drying of the concentrated extract may typically be carried out by spray drying or freeze drying. The particular means employed for drying the concentrated extract is not critical to the present invention. The dried coffee powder then exits the drying means by line 38.

Considering now the separated aromatics-laden gases in line 18, they are passed through at least two condensers. Not considering FIG. 1 for a moment, the first condenser through which the aromatics-laden gases are passed is maintained at a suitable temperature for water, acetic acid and high boiling fractions to be condensed. As discussed earlier, this first condensate is normally discarded for it primarily contains water. The last condenser is maintained at a temperature in the range of from about 0° C. to 5° C. The aromatics-laden gases that are not condensed by this last condenser are vented to the atmosphere. As discussed earlier, operation with still lower condensation temperatures is uneconomical and totally unnecessary for applicant has discovered that instant coffee product produced with only the volatile aromatics condensed in the last condenser provides a highly desirable product. Moreover, some of the volatile aromatic fractions obtained at substantially lower condensation temperatures may be undesirable in that they may contain distinct sulfury and/or harsh notes.

If desirable, any number of additional condensers may be employed between the minimum of two condensers that are required by the present invention to condense and recover further particular volatile aromatic fractions.

Thus, after the aromatics-laden gases are passed through the required first condenser which primarily condenses water and is preferably maintained at a temperature in the range of from about 75° C. to 90° C., and before the balance of the aromatics-laden gases are passed through the last required condenser, the aromatics-laden gases may be passed through an additional one or more condensers situated between the first and last condensers which operate at gradually lower temperatures as the aromatics-laden gases pass from the first condenser to the last condenser.

Returning now to the drawing, FIG. 1 shows the preferred embodiment of passing the aromatics-laden gases through a total of three condensers designated as condensers 40, 42 and 44, respectively. Condenser 40 is one of the two condensers required by the present invention in which water, acetic acid and high boiling volatile aromatics are condensed. Condenser 44 is the other of the two condensers required by the present invention in which desirable volatile aromatics are removed from the aromatics-laden gases and collected. Condenser 42 is optional. In this preferred embodiment, it removes a volatile aromatics fraction containing relatively lower boiling volatiles than the more volatile aromatics condensed in condenser 44.

The type of condenser employed may be any one which is conventional in the art. Although coil and plate type condensers may be employed, shell and tube condensers are preferred. Moreover, no matter which type of condenser is used, it is desirably constructed such that the aromatics-laden gases only make one pass therethrough to avoid any possible hold-up of the condensates within the condenser.

More particularly, the separated aromatics-laden gases in line 18 are first passed through condenser 40 which is maintained at a temperature of about 75° C. to 90° C., although other temperatures may be employed which condense substantially all of the water from the aromatics-laden gases. The temperature of the first condenser will vary depending upon the temperature of the draw-off extract. Thus, the temperature of the first condenser will generally be maintained at a temperature which is lower than the maximum extract temperature. The condensate obtained from the first condenser is passed through line 46 and is normally discarded.

The balance of the aromatics-laden gases is then passed through line 48 into condenser 42 which is serially connected with condenser 40. Condenser 42, in this preferred embodiment, is cooled with water having a temperature in the range of from about 55° C. to 70° C. The second volatile aromatic condensate produced in condenser 42, due to its lower volatility than the condensate produced in condenser 44, is suitable for addition via line 50 to the concentrated extract in line 32. Alternatively, and not shown in the drawing, this second condensate may be encapsulated by techniques known to those skilled in the art and added to the dried coffee powder at line 38 in capsule form. One particular technique for encapsulating these volatile aromatics is discussed in now abandoned U.S. Application Ser. No. 931,503, filed Aug. 7, 1978 to Liu, et al., which is incorporated herein by reference as if set out in full.

Aromatics-laden gases that are still uncondensed are then passed through line 52 into condenser 44 which is serially connected with condenser 42. Condenser 44 is cooled with ice water which is generally at a temperature in the range of from about 0° C. to 5° C. The gases which are not condensed in condenser 44 are vented to the atmosphere through line 54 and escape. The third condensate of volatile aromatics, which contains concentrated, relatively highly volatile components is very unstable and is preferably immediately mixed with a liquid edible oil, such as olive oil, corn oil, but desirably coffee oil, to form en emulsion to thereby stabilize this condensate. Generally, the amount of condensed volatile aromatics mixed with liquid edible oil is in the ratio of from about 2:1 to 1:3. This emulsion may be prepared by passing the third condensate from line 56 into mixing chamber 58. The liquid edible oil is introduced into mixing chamber 58 from an edible oil source 60 by line 62. The emulsion may then be encapsulated (not shown), preferably by the procedure disclosed in the Liu, et al. application discussed above. As yet another alternative, the condensates obtained from condensers 42 and 44 may be combined and then encapsulated. The capsules may then, if desired, be combined with dried coffee extract.

Preferably, as shown in the diagram, the emulsion may be pumped by a pump (not shown) into line 64 from where it is introduced into plating means 66. Here, the emulsion is plated onto the dried coffee powder to provide increased in-jar aroma of the instant coffee product. Such a plating technique, including the steps of preparing the emulsion, is disclosed in U.S. Pat. No. 3,148,070 issued to Mishkin, et al. which is incorporated herein by reference as if set out in full. If desired, the second condensate of volatile aromatics may also be employed for plating onto the dried coffee powder.

After the optional plating step, the instant coffee product is then packaged in a conventional manner shown schematically in FIG. 1 by packaging means 68.

In the embodiment wherein only the two condensers required by the present invention are employed, i.e., only condensers 40 and 44 in FIG. 1, the condensate obtained in the last condenser 44 would, in effect, be a combination of the condensates obtained from condensers 42 and 44 when employing the preferred embodiment shown in FIG. 1. This combined condensate may either be plated onto the dry coffee powder or, if desired, encapsulated and mixed with the coffee powder in accordance with the procedures discussed above.

Figure 2:
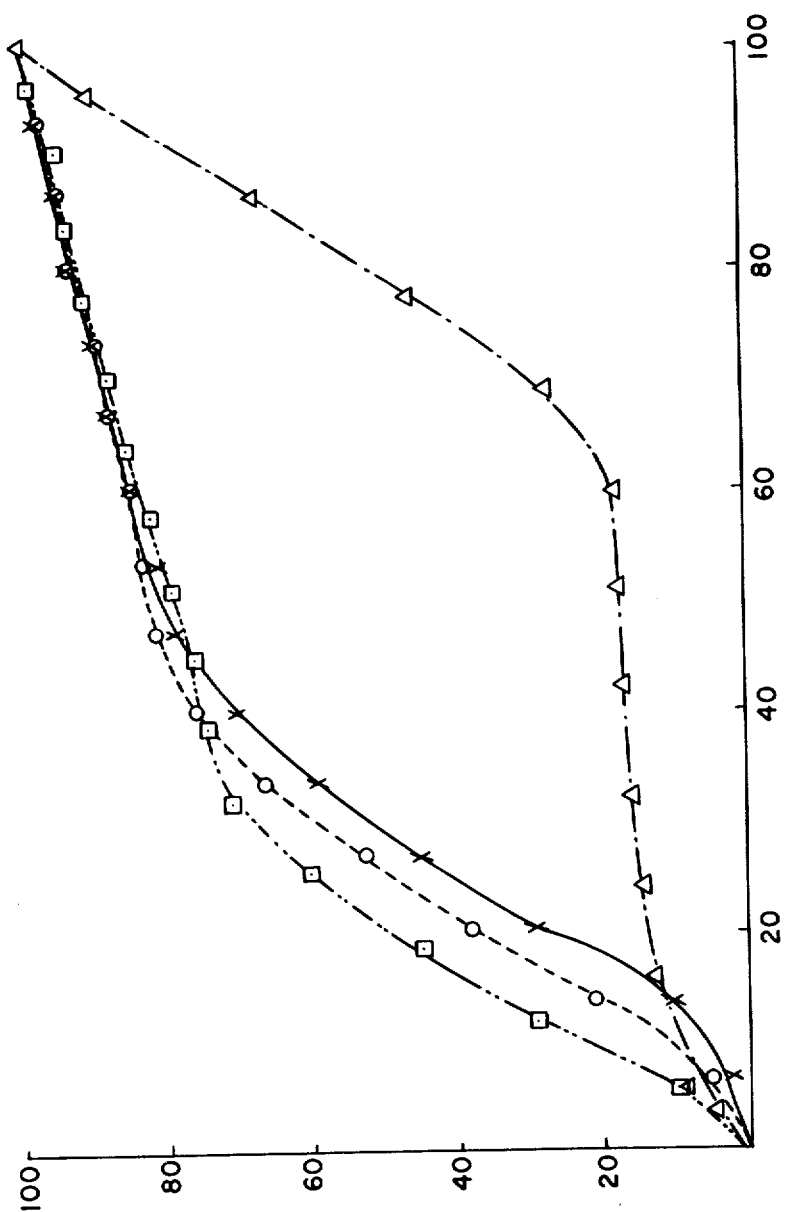
FIG. 2 is a series of graphs all plotted on the same coordinates of percent cell cycle time (abscissa) versus percent accumulated volume (ordinate) for (1) aromatics-laden gases evolved during an entire extraction cycle (delineated by "□"); (2) for coffee extract produced during an entire extraction cycle (delineated by "Δ"); and condensates obtained by (3) passing the aromatics-laden gases through a condenser maintained at a temperature of from about 55° C. to 70° C. (delineated by "X") and then (4) passing the non-condensed aromatics-laden gases through a condenser maintained at a temperature of from about 0° C. to 5° C. (delineated by "O"), respectively.

Turning now to FIG. 2, the graphs are presented to demonstrate, based on actual data obtained from the process of the present invention, that a very considerable amount of the volatile aromatics present in the roasted and ground coffee is obtained from the draw-off extract. Thus, by treating the entire draw-off extract as well as aromatics-laden gases evolved during the wetting step in accordance with the process of the present invention, applicant is able to treat essentially all of the aromatics-laden gases evolved during the entire extraction step and correspondingly therefore, is able to recover essentially all of the volatile aromatics that are entrained with these aromatics-laden gases.

In FIG. 2, for one complete extraction cycle, the percent cycle time is shown on the abscissa and the percent accumulated volume is shown on the ordinate. The curve delineated by triangles ($\Delta$) represents the percentage accumulated volume of draw-off extract as a function of the percent cell cycle time. After about 60% of the cell cycle time has passed, less than about 18% of the total draw-off extract has been accumulated. This extract, obtained during the wetting phase, is generally extract that may have been held up in the lines from previous extractions. After the 60% cycle time, the curve turns sharply upward indicating the approximate beginning of the extraction step where draw-off extract starts leaving the percolator. Correcting for the extract carry over and the like, the percent cycle time at which the wetting step is complete is usually the time required to fill the percolator with extraction medium. This time is generally one half of an extraction cycle or 50% of the cell cycle time.

Corresponding to the 50% cell cycle point at which the wetting phase is complete, i.e., all of the displaced aromatics-laden gases have evolved from the percolator, it is seen, when referring to the curve which represents the percent accumulated volume of aromatics-laden gases which is delineated with squares ($\square$), that the amount of aromatics-laden gases displaced is only about 80% of the total. Hence, approximately 20% of the total aromatics-laden gases are obtained by further subjecting the entire draw-off extract to the process of the present invention. This corresponds to obtaining about an additional 20% of the volatile aromatics which would not be obtained if the aromatics-laden gases displaced during the wetting step were treated alone.

This is clearly shown in the curves delineated by crosses (X) and circles (O) which represent the percent accumulated volume of volatile aromatic condensates versus the present cycle time obtained from condensers 42 and 44, respectively, considering the preferred embodiment shown in FIG. 1. Thus, at 50% of the cell cycle time, only about 80% of the total respective condensates have been obtained. It is not until the entire draw-off extract has been treated that the remaining 20% of the total respective condensates are obtained.

In accordance with a preferred embodiment of the process of the present invention, the foregoing described process is modified such that it is made even more efficient by providing for the simultaneous introduction of both the draw-off extract and the aromatics-laden gases into the separation chamber which results in providing substantially uniform and constant rates of flow throughout the entire cell cycle time of the separated extract and separated aromatics-laden gases into the subsequent processing steps. Not only does this alternative embodiment make the process of the present invention more economically desirable but, as well be discussed, provides for an even greater effectiveness for recovering the desirable volatile aromatics.

As was discussed earlier in connection with the embodiment of the present invention shown in FIG. 1, it generally takes about one half of an extraction cycle or 50% of the cell cycle time for the wetting step of percolator 12 to be completed. During this time, except for extract that may have been held up in the lines from previous extractions, essentially only evolved aromatics-laden gases from percolator 12 enter separation chamber 16 during the first half of the extraction cycle and into the subsequent aromatics-laden gases treatment steps for condensing and recovering the volatile aromatics contained therein. During that same first half of the extraction cycle, however, the extract treatment means may not therefore be operating at its most efficient design capacity.

This may particularly be true in, for example, aromatic removal means 26 where a steam stripping column is typically employed. Due to the relatively low flow rate of extract during the first half of the cell cycle, the liquid-gas contact in the column may not be the most efficient for removing the aromatic constituents contained in the extract since the column would be designed for the maximum-peak flow rate of extract expected to pass through it.

Figure 3:
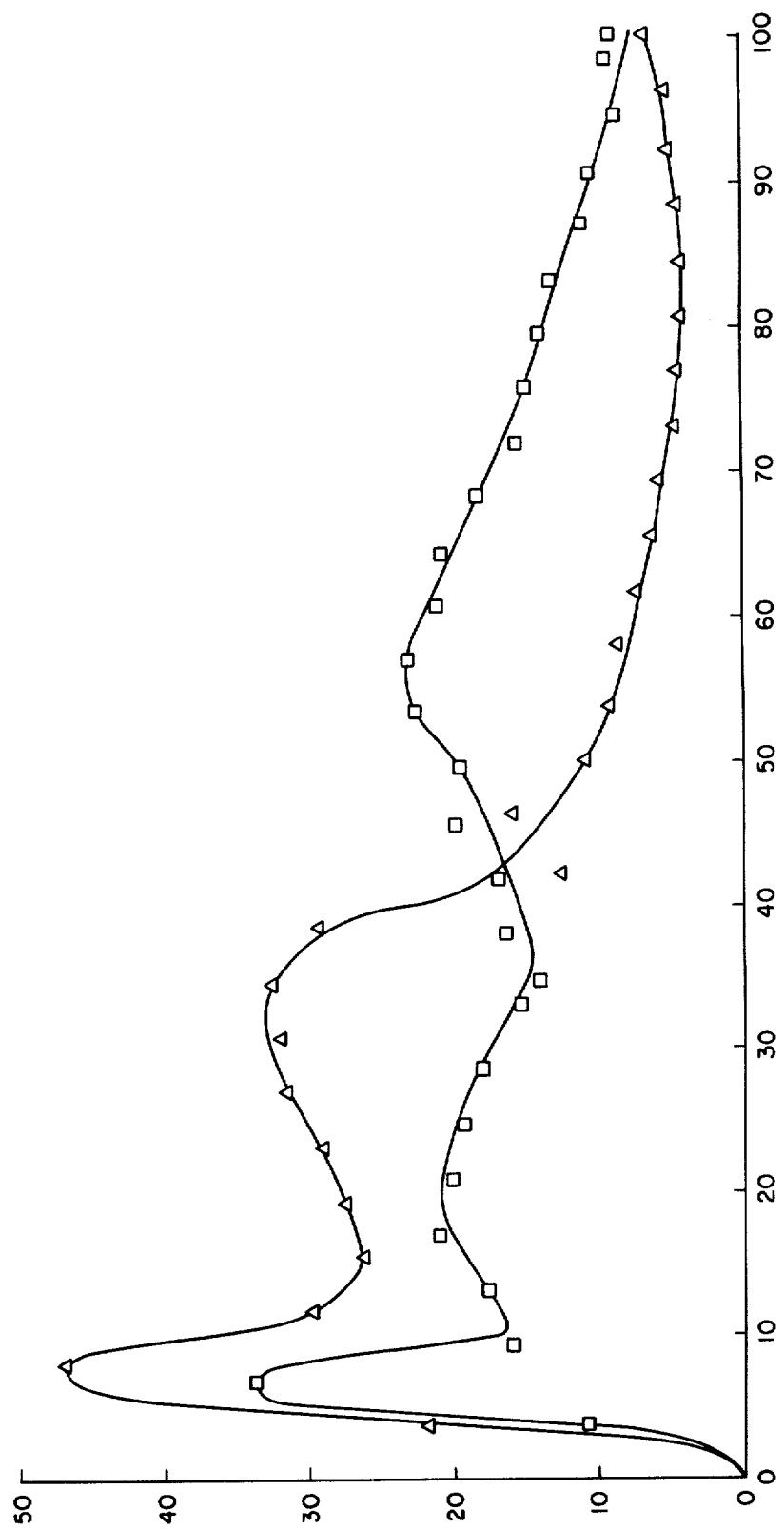
FIG. 3 is a series of graphs plotted on the same coordinates of percent cell cycle time (abscissa) versus gas flow rate in cubic meters per hour (ordinate) for (1) aromatics-laden gases leaving the separation chamber during an entire extraction cycle in the embodiment of the present invention where the fresh, roast and ground coffee is not pre-wetted (delineated by "Δ") and (2) aromatics-laden gases leaving the separation chamber during an entire extraction cycle in a preferred embodiment of the present invention where the fresh, roast and ground coffee is pre-wetted (delineated by "□").

Furthermore, when the aromatics-laden gases are evolved during the wetting step, it is found that there is a surge of gases emitted from percolator 12 almost immediately and the flow rate of the gases rapidly tapers off to a relatively constant flow. This is demonstrated in FIG. 3. The curve delineated by triangles (Δ) represents the rate of flow of aromatics-laden gases leaving separation chamber 16 during an entire cell cycle when employing the embodiment of the present invention shown in FIG. 1. As is seen, the flow rate of the gases peaks almost immediately to a flow rate of approximately 47.5 cubic meters per hour then tapers off to a flow rate of about 5.0 cubic meters per hour. The condensers (40, 42 and 44) for treating the aromatics-laden gases, for example, must however be designed to be able to treat the gases at its peak rate of flow into this treatment system. Accordingly, when the aromatics-laden gases are entering the condensers subsequent to the peak flow rate, the condensers may not be operating at their most maximum design efficiency.

In this preferred embodiment therefore, applicant has found a means for providing a substantially uniform, constant flow rate for both the draw-off extract as well as for the aromatics-laden gases into the respective treatment zones for essentially the entire cell cycle time. Applicant accomplishes this desirable objective by wetting dry, fresh roasted and ground coffee with an extraction medium while simultaneously extracting coffee that has been previously wetted. The aromatics-laden gases that are evolved during the wetting step of the fresh, ground roast coffee and the draw-off extract resulting from the extraction of the already wetted coffee are then concurrently introduced into the separation chamber to be processed as described in the embodiment discussed earlier. The employment of a pre-fill cell is disclosed in U.S. Pat. No. 3,995,067, issued Nov. 30, 1976 to Marsh, et al.

Figure 4:
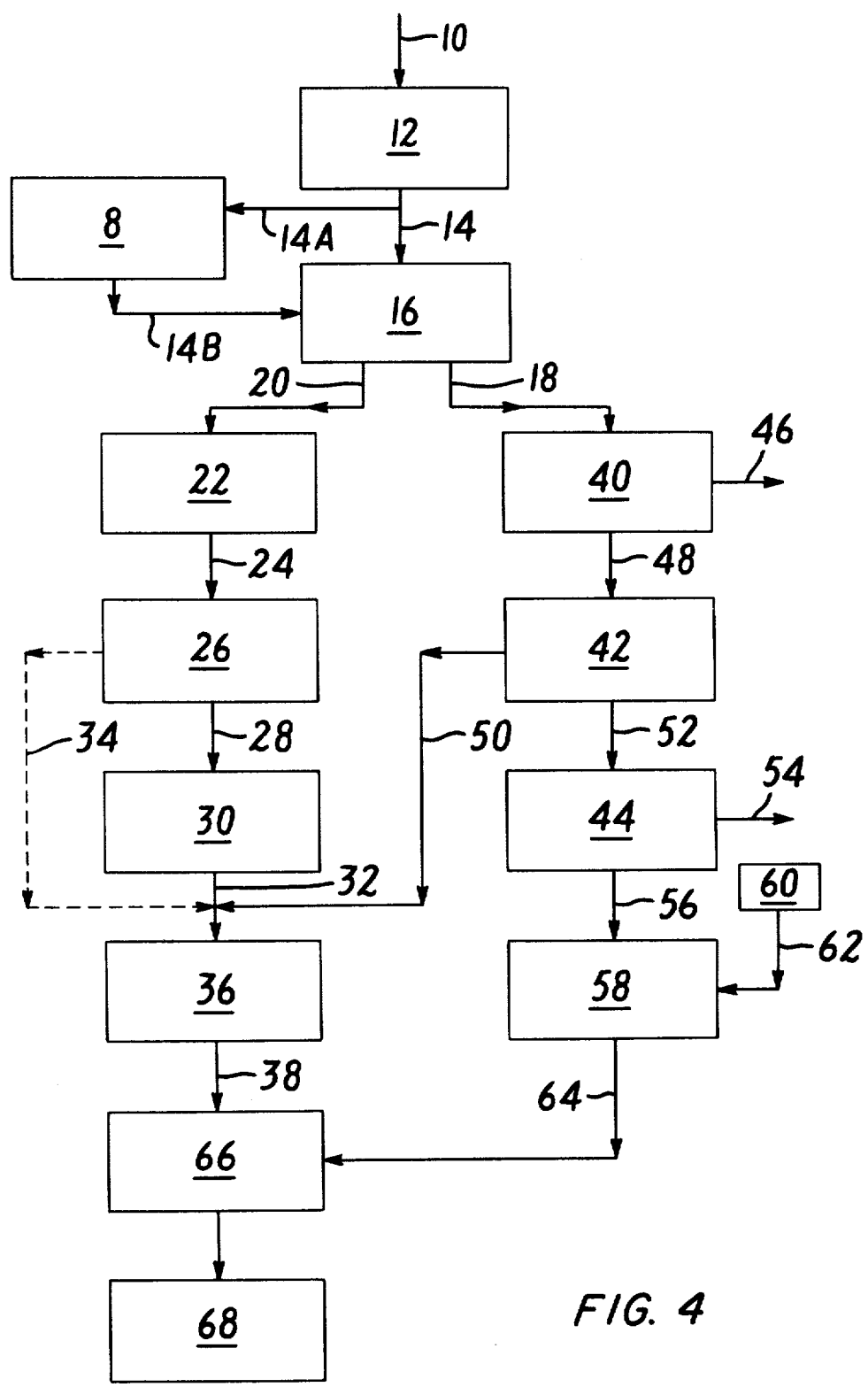
FIG. 4 is a schematic diagram of a preferred embodiment of the process of the present invention employing a pre-fill cell.

More particularly, referring to FIG. 4 in which the same reference numerals are employed as in FIG. 1 to indicate like elements, the process of this preferred embodiment is carried out by first providing an extraction medium to enter line 10 into a percolator 12. As in the embodiment shown in FIG. 1, the extraction medium employed may simply be hot water, water containing coffee solubles or coffee extract obtained from a conventional battery of percolator cells (not shown).

Percolator 12, (commonly referred to as the draw-off cell) contains unextracted ground roast coffee which has already been pre-wetted in a previous extraction cycle. Thus, the coffee in percolator 12 has already been subjected to a wetting step (pre-wetted) and substantially all of the aromatics-laden gases that are evolved during such a wetting step of fresh, ground roast coffee have already been evolved and recovered during such previous extraction cycle. Although the coffee in percolator 12 has not as yet been extracted, it is nevertheless completely filled with extraction medium as a result of the pre-wetting step. Accordingly, as soon as extraction medium is pumped (not shown) into percolator 12 by line 10, draw-off extract immediately begins to flow from the percolator at a constant and uniform rate and is split into lines 14 and 14A, respectively.

The portion of the draw-off extract entering line 14 is passed directly into separation chamber 16 in which aromatics-laden gases entrained within the extract are removed. The separated extract and aromatics-laden gases are then treated in a manner similar to that described earlier. The remaining portion of draw-off extract entering line 14A is simultaneously introduced into percolator 8 which, in this preferred embodiment, acts as a pre-fill cell in which fresh, ground roast coffee is subjected to only a wetting step in this extraction cycle.

As draw-off extract from line 14A enters percolator 8 and wets the dry roasted and ground coffee, gases laden with volatile aromatics are evolved and displaced upwardly as the draw-off extract rises in and fills the percolator. These aromatics-laden gases along with any coffee extract that may be carried over by the aromatics-laden gases are passed through line 14B into separation chamber 16 at the same time that draw-off extract is also entering separation chamber 16 from line 14. The aromatics-laden gases are separated from the liquid extract in chamber 16 and the separated gases and separated extract are then treated in a manner similar to that described earlier.

When the entire extraction cycle is completed, the now pre-wetted coffee in percolator 8 is ready to be extracted in a subsequent extraction cycle in a manner similar to that just described for the pre-wetted coffee in percolator 12 and, correspondingly, new fresh ground roast coffee is provided in another percolator (not shown) to be pre-wetted in the manner just described for percolator 8. The process is thus carried out on a continuous basis.

By virtue of this preferred embodiment, the unextracted coffee contained in percolator 12 is extracted for an increased period of time, i.e., extraction occurs throughout the entire cell cycle. The efficiency of the extraction is thus increased by allowing more time for volatile aromatics and other coffee material to dissolve in the extraction medium.

In addition, because the draw-off extract from percolator 12 is split into two streams (one of the streams, line 14A, being used to wet and fill pre-fill percolator cell 8), the amount of extraction medium entering percolator 12 may be increased thereby resulting in a more desirable higher draw-off ratio. Accordingly, the draw-off ratio based on the total weight of draw-off extract leaving percolator 12 to the weight of coffee originally contained in the percolator may range from 4.0 to 6.5:1, most preferably from 5.0 to 6.0:1. Upon leaving percolator 12, the draw-off extract may be split such that a draw-off ratio of about 2.0 to 4.5:1, and preferably 3.0:1 is passed directly into the separation chamber with the remaining portion of the draw-off extract, 2.0:1, being passed into percolator 8.

Similarly, in this preferred embodiment, the wetting of the fresh, ground roast coffee contained in percolator 8 also desirably takes place throughout the entire cell cycle. In this manner, the aromatics-laden gases evolved during the wetting step leave percolator 8 at a correspondingly slower rate of flow. Additionally, by treating the draw-off extract in separation chamber 16 to remove aromatics-laden gases entrained therein at the same time that evolved aromatics-laden gases from percolator 8 are introduced into separation chamber 16, the flow rate of the gases leaving chamber 16 is substantially uniform and constant. Returning to FIG. 3, this is demonstrated in the curve delineated by squares (□) which represents the flow rate of aromatics-laden gases leaving chamber 16 for a complete cell cycle when employing a pre-fill cell. As is seen, the peak representing the initial surge of evolved gases is considerably flatter and tapers off more gradually to a rate of flow which is substantially higher and more uniform than that associated with the embodiment shown in the curve delineated with triangles (Δ).

This ability to provide a substantially uniform and constant rate of flow of the aromatics-laden gases into the gases treatment zone increases the effectiveness of the present invention by enabling greater recovery of volative aromatics. The condensers employed for treating the aromatics-laden gases, for example, may now be designed for a gas flow rate which is substantially uniform and constant rather than for a flow rate which has a surge peak thereby increasing the efficiency of these condensers. So too, the efficiency of the other equipment employed in the other processing steps is also correspondingly increased.

Moreover, by providing a more uniform and constant flow rate of the aromatics-laden gases, the ability of the gases to function as a stripping medium and carrier is also increased so that the aromatics-laden gases more effectively strip the desirable volatile aromatics from the coffee in percolator 8, from the extract in separation chamber 16, and from the condensate in condenser 40 (in which desirable low boiling fractions may have become entrained) to ultimately recover these volatile aromatics in condensers 42 and 44 and be incorporated into the final instant coffee product.

As alternative embodiments (not shown in FIG. 4), percolator 8 acting as a pre-fill cell may be pre-wetted by sources other than draw-off extract obtained from percolator 12. Thus, for example, if desired the extraction medium entering line 10 may be split to simultaneously enter both percolators 8 and 12, respectively, and the draw-off extract leaving percolator 12 and aromatics-laden gases leaving percolator 8 may be directly connected to separation chamber 16. In yet another alternative, a portion of separated extract leaving separation chamber 16 by line 20 or a portion of stripped extract leaving aromatic removal means 26 by line 28 may be split from these lines and employed as the medium for wetting the fresh, ground roast coffee in percolator 8 in which the output line, line 14B, is directly connected to separation chamber 16. Simultaneously, an external source of extraction medium is provided for extracting the pre-wetted coffee contained in percolator 12 which is also directly connected to separation chamber 16 by line 14. Line 14A, in this alternative embodiment, would of course not be employed. In each of these alternative embodiments, the draw-off ratios are adjusted so that the amount of extract entering concentration means 30 is in each instance in the range of about 2.0–4.5:1 and preferably about 3.0:1 and the amount of extract entering percolator 8 is about 2.0:1.

Except for the differences noted above, the remaining process steps and parameters, including but not limited to temperature and pressure, employed in the preferred embodiment shown in FIG. 4 are the same as those described for the process of the present invention shown in FIG. 1 discussed earlier.

Having descibed the basic concepts of this invention, the following Examples are set forth to illustrate the same. They are not, however, to be construed as limiting the invention in any manner.

EXAMPLE 1

450 kg. of freshly ground roasted coffee are loaded into a percolation cell. Approximately 2,250 kg. of coffee extract obtained from a battery of percolation cells are continuously introduced into the percolator containing the fresh roasted and ground coffee. As the ground coffee contained within the cell is wetted by the coffee extract, approximately 900 kg. of the extract are absorbed into the ground coffee. During the wetting step, approximately 3.25 cu. m. of aromatics-laden gases are evolved and displaced by the incoming coffee extract. These aromatics-laden gases, together with some coffee extract carried over and coffee extract hold-up in the piping from previous extractions, are continuously introduced into a liquid-gas cyclone separator as they are being evolved and displaced. After about 7.5 min., i.e., 50% of the cell cycle time, draw-off extract begins to emerge from the top of the percolator.

The initial draw-off extract is at a temperature of about 65° C. and gradually rises as extraction continues to a temperature of about 96° C. The pressure in the draw-off extract is less than about 0.34 bar. Approximately 1,350 kg. of draw-off extract are then obtained from the cell and continuously passed through the liquid-gas cyclone separator wherein approximately an additional 0.8 cu. m. of aromatics-laden gases are separated.

The separated extract, as it is being produced, is continuously processed in a manner conventional in the art to provide a dried coffee powder. As will be more fully discussed below, during various steps of the extract processing, recovered volatile aromatics are added to the extract. Thus, the extract is cooled, steam stripped, concentrated by vacuum evaporation, aromatics are returned and it is then freeze-dried.

While the separated extract is being continuously processed, all of the separated aromatics-laden gases are also continuously being treated as follows. They are first introduced into a condenser maintained at a temperature of about 90° C. wherein a total of about 2.81 kg. of condensate are obtained. This first condensate, containing approximately 99% water, is discarded.

The aromatics-laden gases not condensed in the first condenser are then passed into a second condenser maintained at a temperature of about 64° C. wherein a total of about 2.5 kg. of condensate are obtained. This second condensate is added to the extract just after it is concentrated.

The aromatics-laden gases not condensed in the second condenser are then passed into a third condenser maintained at a temperature of about 2.2° C. wherein a total of about 0.82 kg. of condensate is obtained. This third condensate is immediately emulsified with 1.1 kg. of coffee oil and plated onto dried coffee powder in accordance with the procedure described in U.S. Pat. No. 3,148,070. The gases not condensed by this third condenser are allowed to escape into the atmosphere.

The coffee product produced by this process has a strong and natural coffee-like in-jar aroma and a smooth, balanced in-cup coffee flavor on reconstitution with water.

EXAMPLE 2

(COMPARISON EXAMPLE)

The process of Example 1 is repeated with the exception that the condensates obtained from each of the condensers (including the first condensate which is discarded in Example 1), are added to the extract prior to the extract being subjected to any processing, i.e., prior to the extract being concentrated. None of the condensates are emulsified with oil.

The resulting coffee product produced in this Example, which is not in accordance with this invention, does not have any appreciable in-jar aroma and the aroma is not coffee-like. Additionally, the in-cup flavor of this product is flat, and generally poor in quality.

EXAMPLE 3

The process of Example 1 is repeated with the major difference being that two condensers are employed instead of three. Thus, after leaving the liquid-gas separator, the aromatics-laden gases are introduced into a first condenser maintained at a temperature of about 85° C. wherein about 4.99 kg. of a first condensate are obtained and discarded.

The balance of the aromatics-laden gases are then passed into a second condenser maintained at a temperature of about 0° C. wherein about 1.22 kg. of a second condensate are obtained. As in Example 1, this second condensate is immediately emulsified with oil and plated onto coffee powder.

In comparison to the coffee product prepared in Example 1, the coffee product prepared in this Example is somewhat milder in in-jar aroma but has a comparable in-cup flavor.

EXAMPLE 4

Example 3 is repeated with the exception that instead of plating the emulsified second condensate onto coffee powder, the emulsion is encapsulated and the capsules are mixed with dried coffee powder.

The coffee product produced by the Example has an even milder in-jar aroma than the product of Example 3, however, when contacted with hot water, it releases a burst of natural coffee-like in-cup aroma. The in-cup flavor of this product is more coffee-like than that obtained from Example 3.

EXAMPLE 5

The process of Example 1 is repeated with the exception that carbon dioxide from an external source is continuously injected into the line entering the separator at the rate of about 785 cu. cm./sec. The temperature of the first condenser is now maintained at a temperature of about 90° C. and a first condensate of about 2.68 kg. is produced and discarded. The second condenser is now maintained at a temperature of about 62° C. and a second condensate of about 4.13 kg. is obtained and added to concentrated extract. The third and last condenser is maintained at a temperature of about 3° C. yielding about 1.5 kg. of a third condensate which is immediately emulsified with oil and plated onto dry coffee powder.

The coffee product produced by this Example has a slightly stronger in-jar coffee-like aroma than the product produced in Example 1 and has an in-cup flavor which is found to be slightly inferior to that of Example 1.

EXAMPLE 6

The process of Example 1 is repeated with the exception that carbon dioxide from an external source is now continuously injected into the line entering the percolator at a rate of about 785 cu. cm./sec. The temperature of the first condenser is now maintained at about 90° C. and a first condensate of about 4.99 kg. is obtained and discarded. The second condenser is now maintained at a temperature of about 63° C. and a second condensate of about 3.5 kg. is obtained and added to concentrated extract. The third and last condenser is maintained at a temperature of about 0° C. yielding about 1 kg. of a third condensate which is immediately emulsified with oil and plated onto dry coffee powder.

The coffee product produced by this Example has a much stronger in-jar coffee-like aroma than the product produced in Example 1 and has an in-cup flavor which is comparable to that of Example 1.

EXAMPLE 7

The process of Example 1 is repeated with the exception that an external source of heat is provided to heat the draw-off extract to a temperature of 96° C. prior to entering the separation chamber. Thus, in Example 1, the initial draw-off extract is at a temperature of about 65° C. and gradually rises as extraction continues to a temperature of about 96° C. In the present Example, however, the initial draw-off extract is now heated so that it too enters the separation chamber at a temperature of about 96° C. This external heating is maintained until the temperature of the draw-off extract leaving the percolator is itself about 96° C.

The temperatures of the three condensers employed are the same as those in Example 1. In the present Example, however, 4.9 kg. of a first condensate are obtained; 5 kg. of a second condensate are obtained; and 0.59 kg. of a third condensate is obtained. All of the respective condensates are treated in the same manner as in Example 1. The first condensate is discarded; the second added to concentrated extract; and the third is plated onto dry coffee powder as an emulsion.

The coffee product produced by this Example has a very strong in-jar aroma having a slightly sulfury smell. The in-cup flavor of the reconstituted coffee is somewhat flatter when compared to that of Example 1.

EXAMPLE 8
(COMPARISON EXAMPLE)

In this comparison example, which is not in accordance with the present invention, Example 1 is repeated except that the temperature of the coffee extract that is introduced into the percolator cell containing fresh ground roast coffee is such that the draw-off extract emerging from the cell is at a temperature of about 101.7° C. and under a back pressure which prevents it from boiling. As this draw-off extract enters the separation chamber, it is allowed to flash. The aromatics-laden gases are then passed through three serially connected condensers maintained at the same temperatures as described in Example 1. The first condenser produces about 13.5 kg. of condensate; the second, about 1.8 kg.; and the third, about 0.59 kg. All of the condensates obtained are employed in exactly the same manner as described in Example 1.

The instant coffee product produced by this comparative Example has a harsh, slightly sulfury in-jar aroma and an inferior in-cup flavor when compared to the coffee product prepared by Example 1.

EXAMPLE 9
(COMPARISON EXAMPLE)

This comparison example is included to show the amount of volatile aromatics that are obtained from the draw-off extract itself which is over and above that obtained from the wetting phase of the extraction step alone.

Accordingly, Example 1 is repeated with the exception that during the wetting phase, all of the aromatics-laden gases that are evolved and displaced are vented to the atmosphere and allowed to escape. The point in time in the extraction cycle when aromatics-laden gases cease to be displaced as a result of the wetting phase is determined by noting when the draw-off extract first emerges from the outlet of the percolator cell. The entire draw-off extract is then treated in accordance with the present invention. Thus, after passing the liquid-gas separator, the separated aromatics-laden gases evolved solely from the draw-off extract itself are passed through three condensers maintained at the very same temperatures as in Example 1. 0.95 kg. of condensate is obtained from the first condenser; 1.04 kg. from the second; and 0.27 kg. from the third condenser.

When these condensate weights are compared to the respective condensate weights obtained in Example 1, in which aromatics-laden gases displaced during the wetting step and aromatics-laden gases entrained within the draw-off extract are both treated, the following Table is obtained:

TABLE

| | Displaced Aromatics-Laden Gases and Draw-Off Aromatics-Laden Gases (kg. of cond.) | Draw-Off Extract Aromatic-Laden Gases Alone (kg. of cond.) | % Extra Condensate Obtained From D.O. Extract |
|---|---|---|---|
| 1st Cond. | 2.81 | .95 | 33.8 |
| 2nd Cond. | 2.50 | 1.04 | 41.6 |
| 3rd Cond. | .82 | .27 | 32.9 |

It is noted that the percentage extra condensate obtained from the draw-off extract as shown in the Table is considerably higher than the approximate 20% which would be expected based on the curves shown in FIG. 2 discussed above. This may be due, in part, to experimental error present in the technique for determining when the wetting phase is actually complete. Thus, when the first traces of extract leave the outlet of the percolator, all of the roasted and ground coffee may not yet be thoroughly wetted by the extraction medium. Accordingly, although some aromatics-laden gases may still be displaced, they are now considered as being entrained with the draw-off extract. Even taking this experimental error into account, the Table still clearly demonstrates that a substantial amount of volatile aromatics are obtained from the draw-off extract itself.

EXAMPLE 10

This example illustrates the preferred embodiment of the present invention in which a pre-fill cell is employed.

As in Example 1, 450 kg. of freshly ground roasted coffee are loaded into a pre-fill percolation cell. Approximately 2,250 kg. of coffee extract obtained from a battery of percolation cells are continuously introduced into a percolation cell containing unextracted ground roast coffee which has been pre-wetted from a previous extraction cycle. Approximately 1,350 kg. of the draw-off extract leaving this percolator are continuously introduced into a liquid-gas cyclone separator. The remaining 900 kg. of draw-off extract are simultaneously split off from the draw-off extract line and introduced into the pre-fill percolation cell containing the dry, fresh ground roast coffee. The outlet for the pre-fill percolation cell is also directly connected to the liquid-gas cyclone separator.

As the fresh ground roast coffee contained within the pre-fill cell is wetted by the incoming draw-off extract, substantially all of the 900 kg. of extract are absorbed into the ground coffee. Approximately 15 minutes is required for the cell cycle to be complete and the wetting of the fresh ground roast coffee is not complete until the end of the entire cell cycle.

During the wetting of the fresh ground roast coffee, approximately 3.25 cu. m. of aromatics-laden gases are evolved and displaced by the incoming draw-off extract and introduced into the separation chamber.

At the same time that the aromatics-laden gases are being evolved and introduced into the separation chamber from the pre-fill cell, draw-off extract from the other cell is also being simultaneously introduced into the same liquid-gas cyclone separator. Inasmuch as this cell has already been pre-wetted, the moment the coffee extract enters the cell, draw-off extract is immediately obtained and flows into the separator. Approximately 0.8 cu. m. of additional aromatics-laden gases are separated from this draw-off extract.

As in Example 1, the initial draw-off extract is at a temperature of about 65° C. and gradually rises as extraction continues to a temperature of about 96° C. The pressure in the draw-off extract is less than about 0.34 bar.

The separated extract leaving the liquid-gas cyclone separator, as it is being produced, is continuously processed in a manner conventional in the art to provide a dry coffee powder as described in Example 1.

While the separated extract is being continuously processed, all of the separated aromatics-laden gases are also continuously treated in the same manner as discussed in Example 1. Thus, after leaving the liquid-gas separator, the aromatics-laden gases are introduced into three condensers maintained at the same temperatures as set forth in Example 1 and the respective condensates are similarly treated.

In the first condenser, 2.5 kg. of condensate is obtained and discarded. In the second condenser, 2.35 kg. of condensate is obtained and is added to the extract just after it is concentrated. In the third condenser, 1.25 kg. of condensate is obtained and is immediately emulsified with 1.25 kg. of coffee oil and plated onto dry coffee powder.

In comparison to the coffee product prepared in Example 1, the coffee product prepared by this preferred embodiment has an even stronger in-jar aroma and a smooth, balanced in-cup coffee flavor on reconstitution with water.

EXAMPLE 11

The process of Example 10 is repeated with the exception being that two condensers are employed instead of three and coffee extract obtained from a battery of serially connected percolation cells is employed to wet the fresh, ground roast coffee in the pre-fill cell and to simultaneously extract the unextracted, pre-wetted coffee contained in the draw-off percolation cell. The aromatics-laden gases evolved from the pre-fill cell and the draw-off extract leaving the draw-off cell are simultaneously introduced into the liquid-gas cyclone separator.

A total of 1,350 kg. of coffee extract from the battery of percolation cells is introduced into the draw-off cell containing the unextracted pre-wetted coffee. Simultaneously, approximately 900 kg. of the coffee extract is split off and simultaneously introduced into the pre-fill cell containing the fresh, roasted and ground coffee.

After leaving the liquid-gas separator, the separated extract is treated in the same manner as discussed in Example 1 and the aromatics-laden gases are introduced into a first condenser maintained at a temperature of about 85° C. wherein about 4.8 kg. of a first condensate are obtained and discarded.

The balance of the aromatics-laden gases are then passed into a second condenser maintained at a temperature of about 0° C. wherein about 1.39 kg. of a second condensate are obtained. As in Example 1, this second condensate is immediately emulsified with oil and plated onto coffee powder.

The in-jar aroma of the coffee product prepared by this example is somewhat stronger than that found in the product prepared in Example 3 where two condensers are also employed but somewhat milder than that obtained in the product of Example 10. The in-cup flavor of the coffee product prepared in this example is comparable to that obtained in Example 10.

I claim:

1. A process for separating volatile aromatics from roasted and ground coffee beans which comprises:
   (a) wetting dry, roasted and ground coffee beans with an aqueous extraction medium in a first zone to evolve aromatics-laden gases and simultaneously extracting unextracted wetted roasted and ground coffee beans in a second zone with an aqueous extraction medium to obtain an extract at a temperature below 100° C. at essentially atmospheric pressure;
   (b) passing both the aromatics-laden gases and the extract through a separation chamber to separate aromatics-laden gases from extract;
   (c) passing the separated aromatics-laden gases through at least two condensers wherein the first condenser condenses and removes water from the aromatics-laden gases and the last condenser is maintained at a temperature of from about 0° C. to about 5° C. to condense volatile aromatics entrained with the aromatics-laden gases; and then
   (d) collecting the condensed volatile aromatics.

2. The process of claim 1, wherein the temperature of the extract obtained is in the range of about 80° C. to 98° C. at essentially atmospheric pressure.

3. The process of claim 1, wherein inert gas in introduced into the extraction medium being employed to wet the dry, roasted and ground coffee beans prior to its contacting the coffee.

4. The process of claim 1, wherein prior to passing the extract obtained through the separation chamber, inert gas is introduced into the extract.

5. The process of claim 1, wherein the extract obtained is heated prior to passing through the separation chamber.

6. The process of claim 1, wherein the first condenser is maintained at a temperature in the range of about 75° C. to 90° C.

7. The process of claim 6, wherein after the aromatics-laden gases have been passed through a first condenser maintained at a temperature in the range of about 75° C. to 90° C. and prior to subjecting the balance of the aromatics-laden gases to the last condenser maintained at a temperature in the range of about 0° C. to 5° C., the aromatics-laden gases are passed through a condenser maintained at a temperature in the range of about 55° C. to 70° C. to obtain yet another condensate of volatile aromatics.

8. The process of claim 1, wherein the extraction medium is coffee extract obtained from a battery of serially connected percolators.

9. The process of claim 8, wherein the coffee extract obtained from a battery of serially connected percolators is divided such that a portion of the extract is employed as the extraction medium for wetting the dry, roasted and ground coffee beans and the remaining portion of the extract is employed as the extraction medium for the unextracted, wetted roasted and ground coffee beans.

10. A process of making an instant coffee powder of improved flavor and aroma which comprises:
   (a) wetting dry, roasted and ground coffee beans with an aqueous extraction medium in a first zone to evolve aromatics-laden gases and simultaneously extracting unextracted, wetted roasted and ground coffee beans in a second zone with an aqueous extraction medium to obtain an extract at a temperature below 100° C. at essentially atmospheric pressure;

(b) passing both the aromatics-laden gases and the extract through a separation chamber to separate aromatics-laden gases from extract;

(c) passing the separated aromatics-laden gases through at least two condensers wherein the first condenser condenses and removes water from the aromatics-laden gases and the last condenser is maintained at a temperature in the range of from about 0° C. to 5° C. to condense volatile aromatics entrained with the aromatics-laden gases and collecting these volatile aromatics;

(d) treating the separated extract to provide a dried instant coffee powder; and (e) adding collected volatile aromatics to the extract during or after the said treating step of the extract.

11. A process for separating volatile aromatics from roasted and ground coffee beans which process does not include steam stripping of the ground roast coffee beans comprising the steps of:

(a) wetting dry, roasted and ground coffee beans with an aqueous extraction medium in a first zone to evolve aromatics-laden gases and simultaneously extracting unextracted wetted roasted and ground coffee beans in a second zone with an aqueous extraction medium to obtain an extract at a temperature below its boiling point;

(b) passing both the aromatics-laden gases and the extract through a separation chamber to separate aromatics-laden gases from extract;

(c) passing the separated aromatics-laden gases through at least two condensers wherein the first condenser condenses and removes water from the aromatics-laden gases and the last condenser is maintained at a temperature from about 0° C. to about 5° C. to condense volatile aromatics entrained with the aromatics-laden gases; and then (d) collecting the condensed volatile aromatics.

* * * * *